Figure 1:
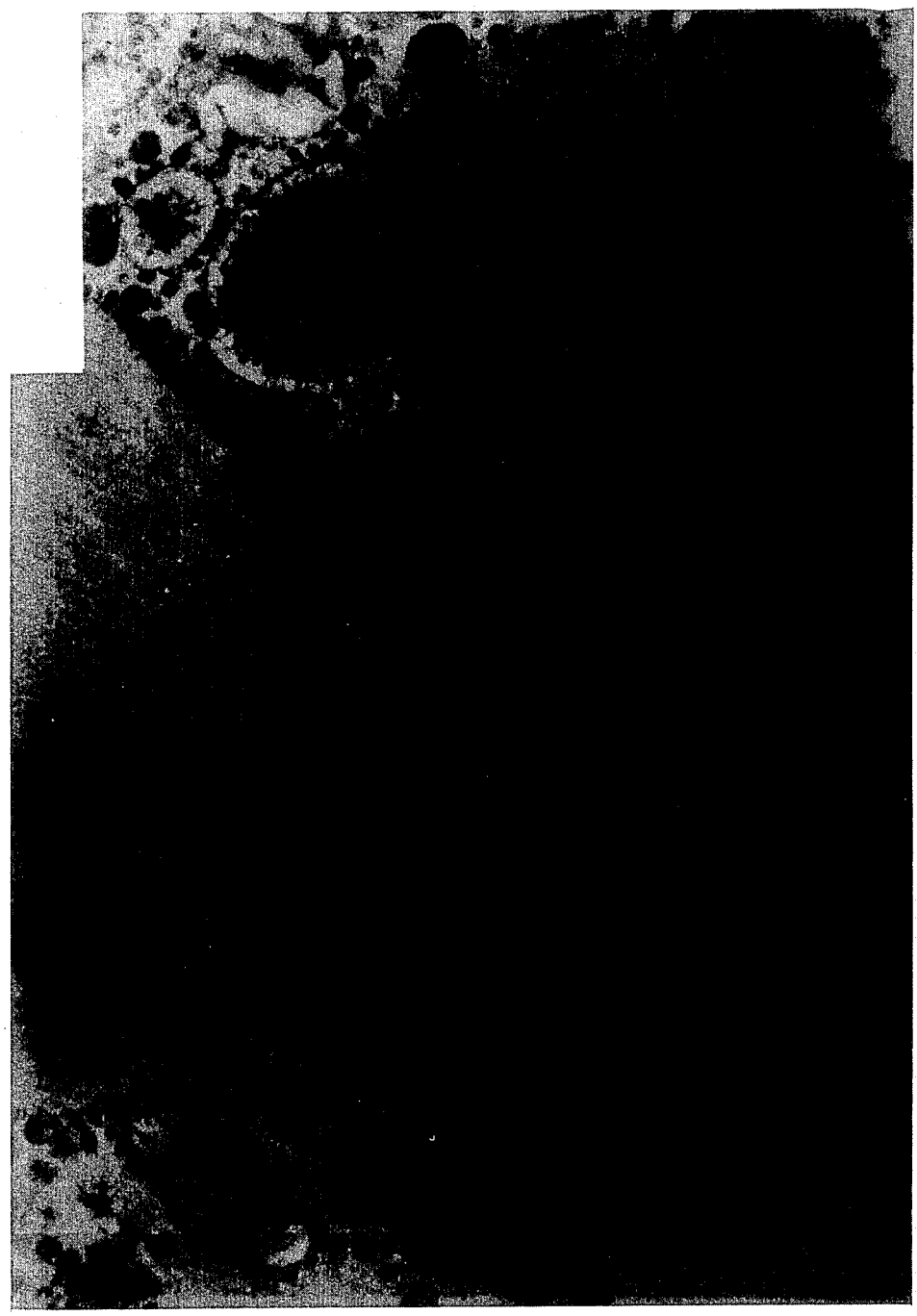

United States Patent [19]  
Cloosterman et al.

[11] 4,404,228  
[45] Sep. 13, 1983

[54] LIPID AND PROTEIN CONTAINING MATERIAL IN PARTICULATE FORM AND PROCESS THEREFOR

[75] Inventors: Aloysius B. M. Cloosterman, Emmerich, Fed. Rep. of Germany; Simon V. Kranenburg, Ijssel, Netherlands

[73] Assignee: Internationale Octrooi Maatschappij "Octropa" B.V., Rotterdam, Netherlands

[21] Appl. No.: 341,184

[22] Filed: Jan. 20, 1982

[30] Foreign Application Priority Data

Jan. 21, 1981 [GB] United Kingdom ............... 8101790

[51] Int. Cl.$^3$ ........................... A23D 5/00; A23J 7/02
[52] U.S. Cl. .................................... 426/98; 426/601; 426/602; 426/656; 426/662
[58] Field of Search ............... 426/98, 601, 662, 656, 426/602

[56] References Cited

U.S. PATENT DOCUMENTS

| | | | |
|---|---|---|---|
| 1,843,051 | 1/1932 | Thiele | 426/662 X |
| 2,632,705 | 3/1953 | Scharf | 426/662 X |
| 2,740,720 | 4/1956 | Horvath | 426/662 X |
| 2,913,342 | 11/1959 | Cameron et al. | 426/98 |
| 3,060,030 | 10/1962 | Obenauf et al. | 426/662 X |
| 3,268,335 | 8/1966 | Circle et al. | 426/662 X |
| 3,549,382 | 12/1970 | Hansen | 426/662 X |
| 4,042,718 | 8/1977 | Rawlings et al. | 426/98 X |
| 4,088,795 | 5/1978 | Goodnight et al. | 426/598 |

FOREIGN PATENT DOCUMENTS 614593 of 0000 United Kingdom .

OTHER PUBLICATIONS

Chemical Abst., vol. 91, No. 7, Aug, 1979, p. 545, No. 54941e.
Abstract of Japanese A-7935249 (Idemitsu Kosan Co. Ltd.) (15-03-1979).

Primary Examiner—Robert A. Yoncoskie  
Attorney, Agent, or Firm—Cushman, Darby & Cushman

[57] ABSTRACT

A dry, free-flowing and non-caking material whose lecithin content can be varied over a wide range is prepared by combining an aqueous medium, a lipid phase containing at least 1 wt % lecithin, and a proteinaceous material, such as a soy concentrate, comprising a porous particulate substance which includes at least 30 wt % of a substantially water insoluble protein, and drying the resulting mixture. The free-flowing and non-caking nature of the particulate product is attributed to the porous and rigid structure of the proteinaceous material which permits the lipis phase to be contained in the interstitial spaces present in each particle.

14 Claims, 2 Drawing Figures

LIPID AND PROTEIN CONTAINING MATERIAL IN PARTICULATE FORM AND PROCESS THEREFOR

The present invention relates to a lipid and protein containing material in particulate form and to a process for the preparation of a lipid and protein containing material in particulate form. Such materials are widely used in the human and animal feedstuff industries. Examples of their use include calf milk replacers and coffee whiteners.

A review article entitled "Spray-Dried Fats" by J D Horn in Flavours March–April 1976 describes the formation of a powder-like material in the form of small globules of fat each of which is microencapsulated in a cell of a soluble material. On reconstitution with water the cell dissolves and the fat is released. The powder-like material is moreover readily formed by spray drying an emulsion of the molten fat and an aqueous medium containing the dissolved cell material. The cell material may for example be skimmed milk powder.

Applications of this microencapsulation technique are for example found in CA-A-802829 General Foods Corporation and GB-A-1124734 J Bibby & Sons Limited. In each of these specifications a hydrophilic, soluble proteinaceous material is used as the cell material. A combination of emulsifiers one of which is lecithin may also be included.

The presence of lecithin in for example an animal feedstuff not only aids the emulsification of the powder material on reconstitution with water, but is also believed to aid in the digestion of the feedstuff. In known processes however the amount of lecithin which can be included in the lipid and protein containing material is limited due to problems which can occur during the drying of the emulsion in the preparation of the material if lecithin is present at relatively high levels.

We have now discovered a process for the preparation of a lipid and protein containing material in particulate form which material includes lecithin and which allows the proportion of lecithin present to vary over a wide range.

According to a first aspect of the present invention there is provided a process for preparing a lipid- and protein-containing material in particulate form comprising combining an aqueous medium, a lipid phase and a proteinaceous material and drying the resulting mixture characterised in that the proteinaceous material comprises a porous, particulate substance which comprises at least 30 wt% of substantially water-insoluble protein and the lipid phase comprises at least 1 wt% lecithin.

We have found that by means of the present process a dry, free-flowing and non-caking material in particulate form can be produced. By substantially insoluble we mean protein which is at least about 75 wt% insoluble in an aqueous phosphate buffer solution at pH 8.2 at 25° C. The insolubility of the substance confers we believe a substantially rigid structure to the particles present in the product.

In carrying out the present process the lipid phase, the proteinaceous material and the aqueous medium are suitably combined by homogenisation to form an emulsion. A homogeniser or colloid mill may for example by employed to produce the emulsion. The emulsion should preferably contain oil globules whose diameter is $20\mu$ or less, more preferably $10\mu$ or less, for example, in the range of from 1 to $3\mu$.

The drying step employed in the present process may for example be spray drying, or drum drying followed where necessary by a comminuting step. The moisture content in the dry product is preferably less than 12 wt%. The preferred moisture content for the product is between 1 and 10 wt%, more preferably between 2 and 4 wt%.

The order of mixing the ingredients with the aqueous medium need not be of importance. It may however be more convenient in some circumstances to bring the proteinaceous material into contact with the aqueous medium before the lipid phase for example if the proteinaceous material contains protein which requires hydration. It may alternatively be more convenient to bring the lipid phase into contact with the aqueous medium prior to the proteinaceous material. If the lipid phase is added first to the aqueous medium and includes some lipids which are normally solid at room temperature it may be added either in a molten state or in a unmolten state to the aqueous medium which is either maintained at or above or is subsequently brought to a temperature at or above the melting point of the lipid phase. Regardless of the order of mixing of the ingredients with the aqueous medium it is preferable that the porous, particulate, proteinaceous material only contacts the lipid phase when the lipid phase is fully molten. If lipids other than lecithin are included they are preferably, but not necessarily, mixed with the lecithin prior to being brought into contact with the aqueous medium.

The proportions of ingredients used in the present process may vary over a wide range. The aqueous medium, which can consist of ordinary tap water, should preferably be kept to a minimum in order to reduce the drying costs as much as possible. We have found however that in some circumstances water should nonetheless comprise at least 50 wt%, preferably 60 to 70 wt%, of the total slurry weight in order to produce a slurry of low enough viscosity to allow the formation of an emulsion and its subsequent spray drying. In one embodiment of the present process additional proteinaceous material is admixed with the slurry immediately prior to drying. In such a case the water content based on the total weight of the material subjected to drying can be relatively low and cost savings in the drying step can be achieved.

The relative proportions of the lipids present in the lipid phase may vary widely. Lecithin is a mixture of fats and phospholipids. If present on its own the lecithin can contribute sufficient fat to produce an acceptable foodstuff. Additional lipids in the form of fats and/or oils are however preferably included. When both lecithin and other lipids are included the lecithin can comprise up to 20 wt% or more of the total lipids. Preferably however the lecithin comprises 2.5 wt%, more preferably 5 wt%, even more preferably 10 wt%, of the total lipids present. Even with such high levels of lecithin the product of the present process can be free-flowing and non-caking and no problems such as clogging need be encountered on for example spray drying.

The relative proportions of proteinaceous material to lipid phase may depend on the particular ingredients employed, although a wide range of proportions is possible. A preferred minimum limit to the amount of lipid phase present based on the proteinaceous material is 5 wt%. More preferably the lipid phase comprises at least 10 wt%, even more preferably at least 20 wt%, of the total lipid phase and proteinaceous material present. A maximum limit on the total amount of lipid phase present may however be necessary depending on the absorbency of the proteinaceous material selected. We have found for example that when the material is a soy concentrate, and no other major ingredients are present, the maximum amount of total lipids which can be added without problems occurring in the drying step is 65 wt%.

Examples of proteinaceous materials suitable for use in the present process include those derived from vegetable and microorganism sources. Particulate examples include potato protein, soy meal, soy concentrate, soy isolate, single cell protein and mixtures thereof.

Other ingredients may optionally be additionally included in the aqueous medium prior to drying and so form an integral part of the powder product. Examples of such ingredients include starch, bleaching earth, diatomaceous earth, sugars and substantially soluble proteinaceous materials. Minor additional ingredients which may also be added to the aqueous mixture include conventional flavourings, colouring, and anti-oxidant additives and emulsifiers. An example of a suitable synthetic emulsifier which may be added is GEM (ethoxylated monoglyceride) produced by Food Industries Limited. Lecithin can itself contribute an anti-oxidant effect to the product. Examples of additional anti-oxidants which can be added include BHA, BHP, propyl gallate, tertiary butyrate, hydroquinone and mixtures thereof.

According to a second aspect of the present invention there is provided a product in particulate form comprising a lipid phase and a proteinaceous material characterised in that the proteinaceous material consists of a porous particulate substance which comprises at least 30 wt% of substantially water-insoluble protein and the lipid phase is contained within interstitial spaces of individual particles of the porous substance and comprises at least 1 wt% lecithin.

Figure 2:
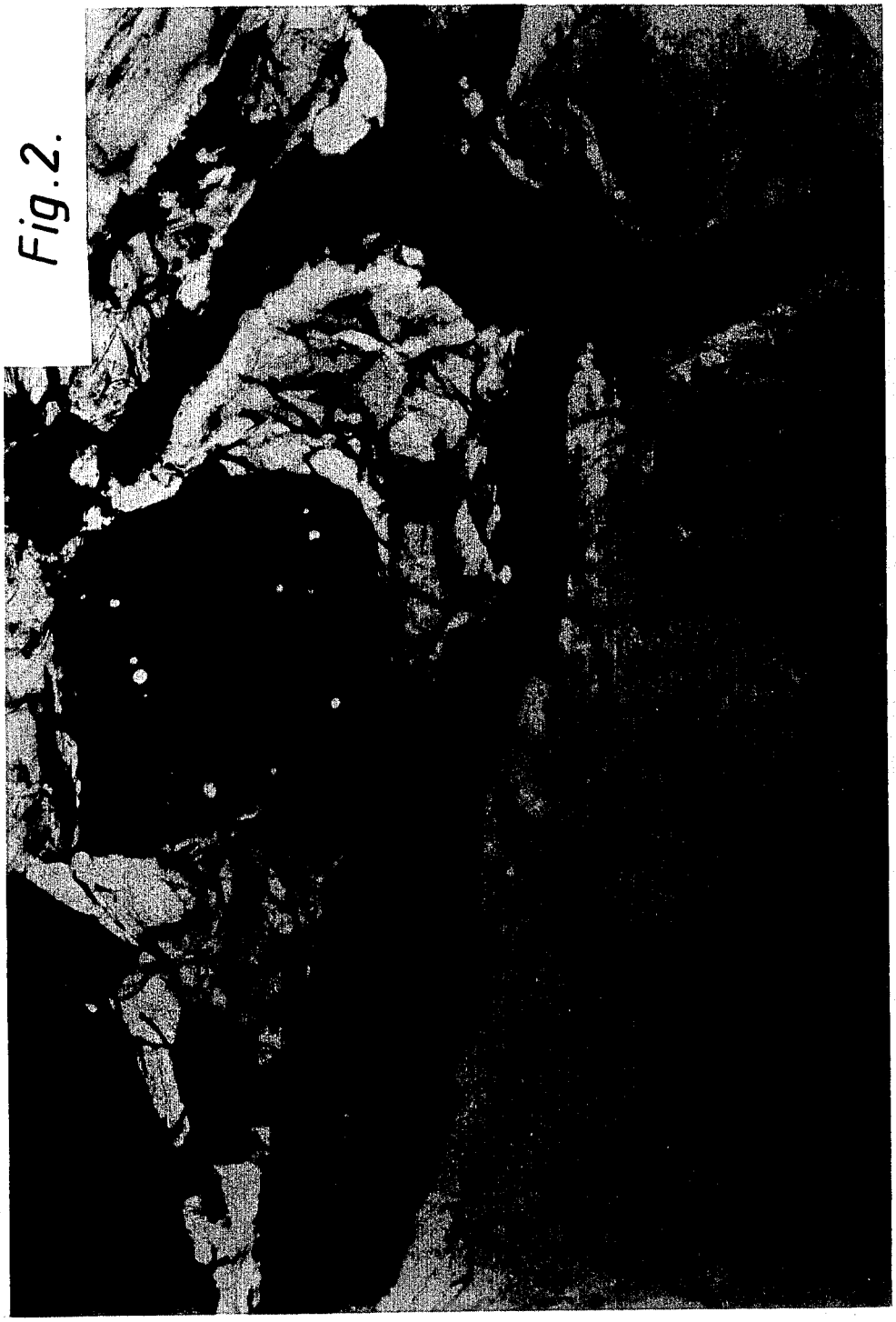

The structural relationship between the lipid phase and the proteinaceous material in the present product has been illustrated by electronmicrospy. The accompanying reproducton of photographs taken by electromicrospy illustrate in FIG. 1 at a magnification of $3 \times 10000$ the relationship between lipid phase and a proteinaceous material which is substantially soluble and in FIG. 2 at a magnification of $3 \times 5000$ the relationship between lipid phase and a proteinaceous material which is substantially insoluble. In the product of FIG. 1 the proteinaceous material is skimmed milk powder which is present as small droplets encapsulating larger globules of fat. In the product of FIG. 2 the proteinaceous material is Soycomil K, a soy concentrate containing about 70 wt% protein of which 95% is insoluble, and is integrally present with the fat in discrete particles. In each photograph representative portions have been labelled P (for proteinaceous material) and fat.

The absence of an encapsulating shell of proteinaceous material in a product embodying the present invention is moreover shown by the different reactions of the two materials illustrated in FIGS. 1 and 2 with an oil soluble dye such as Sudan red. No colour change occurs with the material of FIG. 1. The fat of the material of FIG. 2 however is freely extractable and brings about a marked colour change.

A product embodying the present invention can be free-flowing and non-caking in nature. These properties of the product are believed to be at least partially attributable to the porous and rigid structure of the substantially insoluble protein which it is believed confers on the product the form of particles having an irregular, many-faceted surface. The irregularity of the surface prevents contact between large areas of neighbouring particles.

The lipid phase of the present product may consist entirely of lecithin. Alternatively the lipid phase may comprise a blend of a fat mixture with lecithin. The blend preferably contains at least 2.5 wt% lecithin, more preferably at least 5 wt% and even more preferably at least 10 wt%. If desired lecithin may comprise up to 20 wt% or more of the lipid phase.

The present invention can thus provide a dry, free-flowing and non-caking material in particulate form having a relatively high lecithin and protein content. The presence of lecithin in the product is desirable as it leads to good wettability with an aqueous medium and improved digestability, especially when employed as a calf milk replacer.

A preferred product embodying the present invention comprises 95 to 35 wt% of a proteinaceous material and 5 to 65 wt% of a lipid phase. Preferably the lipid phase comprises 10 to 65%, more preferably 20 to 65% of the same material.

The lecithin employed in the present invention can, for example, be prepared from vegetable seeds such as soy beans, rapeseed and sunflower seeds. The lecithin employed may be native, hydrolysed or fractionated. Hydrolysed soy bean lecithin available commercially from Unimills BV, Zwijndrecht, Netherlands and known as Bolec K is for example suitable for use in the present invention. Bolec K comprises a mixture of about 30 to 40 wt% soy bean oil and about 70 to 60 wt% phospholipids. The minimum and other lecithin levels quoted throughout the present specification are based on the weight of the ingredient actually used. Thus in the case of Bolec K the level of lecithin is calculated on the mixture of soy bean oil and phospholipids comprising this commercially available product.

The ingredient comprising the other lipids may be one or more any readily available fats or oils. The fats should preferably have a melting point between 20° and 100° C., more preferably between 30° and 39° C. The upper limits of 100° C. is convenient to ensure that the fat can be fully molten in water at atmospheric pressure. Suitable fats include vegetable, animal and marine fats. Examples are coconut, palm, palmkernel, fish, soybean, sunflower, tallow, lard, feeding oil and mixtures thereof.

The proteinaceous material preferably includes a protein-containing material derived from a vegetable or a microorganism source. By "substantially insoluble" we mean at least about 75 wt% of the substance is insoluble in an aqueous phosphate buffer solution at pH 8.2 at 25° C. Preferably the substance is at least 85 wt%, more preferably at least 90 wt% and even more preferably at least 95 wt% insoluble. The substance may comprise a variety of ingredients, provided its overall solubility and protein content meet the required criteria. Examples of suitable ingredients include single cell protein material, potato protein, soy meal, soy concentrate and soy isolate. Particular examples of suitable proteinaceous materials include "Soycomil K" which is a soy concentrate available commercially from Unimills BV, Zwijndrecht, Netherlands, "Protamyl MF" a potato protein material available from the Dutch firm of Avebe and "Pruteen" which is a single cell proteinaceous material available from ICI Limited. The approximate content and the approximate percent protein insolubility for each of these materials is given in the Table I.

TABLE I

|  | Approximate protein content (wt %) | Approximate protein insolubility % |
|---|---|---|
| Soycomil K | 68 | 95 |
| Protamyl MF | 80 | 90 |
| Pruteen | 70 | 85 |

The balance of the materials comprising these proteinaceous materials includes soluble and insoluble polysaccharides, crude fibre and ash.

The particulate product of the present invention can optionally comprise materials additional to the lipid and proteinaceous material. Examples of such materials include starch, bleaching earth, diatomaceous earth, sugars, substantially soluble proteinaceous materials and additional fats or oils. Conveniently such materials can be incorporated in the present product during its preparation. Preferably the proportion of these additional ingredients in the final product is not more than about 50 wt% and is preferably less than 20 wt% more preferably less than 20 wt%. Minor additional ingredients which can also be present in the product include conventional flavourings, colouring and anti-oxidant additives and emulsifiers.

The product embodying the present invention may be prepared by the present process.

The product embodying the present invention and the product of the present process can be reconstituted into, for example calf milk replacer, by admixture with an aqueous medium. If desired other ingredients may be admixed with the present products either before or after its reconstitution with an aqueous medium. Examples of such other ingredients include vitamins, minerals, whey powders, skim milk powder and starch.

It is to be understood that the present invention extends to a composition suitable for use as a foodstuff including the present product or the product of the present process, and to a foodstuff prepared by admixing with an aqueous phase the said composition or either of the said products.

Embodiments of the present invention will now be described by way of example only.

EXAMPLES 1 TO 5

A range of dry, free-flowing and non-caking lecithin-containing materials were prepared using as starting materials Soycomil K, Bolec K, water and a fat mixture consisting of 35 wt% fish oil having a melting point of 37° C., 35 wt% palm kernel fraction having a melting point of 35° C., 15 wt% white hog grease and 15 wt% fancy tallow. The amounts of starting material used in each case and the relative proportions of protein concentrate:fat mixture:lecithin are given in Table II below.

TABLE II

|  | Water (l) | Soycomil K (kg) | Fat mixture (kg) | Bolec K (kg) | Conc:fat: lecithin |
|---|---|---|---|---|---|
| Ex. 1 | 17 | 4 | 1.0 | 0.1 | 78:20:2 |
| Ex. 2 | 17 | 4 | 0.9 | 0.1 | 80:18:2 |
| Ex. 3 | 13 | 3 | 1.94 | 0.06 | 60:38.8: 1.2 |
| Ex. 4 | 11 | 3 | 1.8 | 0.2 | 60:36:4 |
| Ex. 5 | 11 | 3 | 1.8 | 0.2 | 60:36:4 |

The procedure followed in each of Examples 1 to 5 was the same and was as follows. The Soycomil K was added to the water which was heated to 70° C. The mixture was stirred in an Ultra-Turrax to form a suspension. The fat mixture was separately heated to 60° C., combined with the Bolec K and added to the suspension of Soycomil K. The total mixture was then stirred to form a slurry which was passed through a Rannie homogeniser at a pressure of $50 \times 10^5$ Pa. The resulting emulsion contained fat globules a major proportion of which had a diameter of between 1 and $3\mu$. The emulsion was spray dried in a NIRO spray drying tower of 125 cm diameter. The air inlet and outlet temperatures in the spray drying tower and the temperature of the emulsion delivered to the tower are given in Table III below.

TABLE III

|  | Emulsion temp (°C.) | Air inlet temp (°C.) | Air outlet temp (°C.) |
|---|---|---|---|
| Ex. 1 | 44–46 | 220 | 87 |
| Ex. 2 | 46 | 220 | 85–90 |
| Ex. 3 | 58 | 200 | 90–95 |
| Ex. 4 | 62 | 175 | 110 |
| Ex. 5 | 64 | 150–160 | 90–100 |

In each case the water content of the resulting dry powder was less than 12 wt%.

To test the sedimentation properties of each product respective solutions of 5 wt% in water of each powder were stirred at 45° C. for 15 secs. Each suspension was then allowed to stand for 1 hour. The degree of sedimentation was found to decrease with increasing levels of lecithin.

The wettability of each powder was also tested and was found to increase with the amount of lecithin present and to be superior to powder produced in a similar manner, but without Bolec K.

EXAMPLE 6

A dry free-flowing and non-caking powder was prepared from water, Soycomil K and Bolec K only. 3.5 kg of Soycomil K were added to 13 l of water at 70° C. and stirred in an Ultra-Turrax to form a suspension. 1.5 kg of Bolec K was mixed into the suspension to form a slurry which was subsequently passed through a Rannie homogeniser. The resulting emulsion contained fat globules a major proportion of which had a diameter of between 1 and $3\mu$. The emulsion was fed to a NIRO spray drying tower at a temperature of 70° C. The air inlet and outlet temperatures in the tower were 200° and 90° C. respectively.

The resulting powder performed satisfactorily in the sedimentation and wettability tests described above.

EXAMPLE 7

Employing the procedure of Examples 1 to 5 a dry free-flowing and non-caking material in powder form was prepared from 15 l water, 3 kg Soycomil K, 0.2 kg Bolec K and 1.8 kg soybean oil. The emulsion was fed to the spray drying tower at a temperature of 50° C.

Respective air inlet and outlet temperatures of the spray drying tower were 150° and 82° C.

The resulting material had a moisture content of less than 12 wt% and was in the form of free-flowing dry powder notwithstanding the fact that soybean oil was employed.

EXAMPLE 8

Following the procedure of Examples 1 to 5 a dry free-flowing and non-caking material in powder form was prepared from 15 l of water, 3 kg Soycomil K, 0.3 kg Bolec K and 2.7 kg of a fat mixture comprising 70 wt% fancy tallow and 30 wt% white hog grease. The spray drying conditions were identical to those employed in Example 7.

EXAMPLE 9

Following the procedure of Examples 1 to 5 a dry, free-flowing and non-caking powder was prepared from 10 l water, 3 kg Soycomil L, 0.3 kg of a 50:50 mixture of Bolec K and Bolec Z and 2.7 kg of fat mixture equivalent to that employed in Example 8. Bolec Z is a native lecithin product prepared from soya bean oil and available from Unimills BV, Zwijndrecht, Netherlands. The spray drying conditions were identical to those described in Example 7.

EXAMPLE 10

Following the procedure of Examples 1 to 5 a dry, free-flowing and non-caking powder was prepared from 10 l of water, 3 kg of a single cell proteinaceous material known as Pruteen and available from ICI Limited, 0.2 kg of Bolec K and 1.8 kg of a fat mixture comprising 33 wt% palm kernel olein hardened to melting point of 39° C., 33 wt% fish oil mixture hardened to a melting point of 37° C., 17 wt% fancy tallow and 17 wt% white hog grease. The spray drying conditions were the same as those employed in Example 7.

EXAMPLE 11

Employing the procedure of Examples 1 to 5 a dry, free-flowing and non-caking powder was prepared from 15 l water, 3 kg Protamyl MF available from Avebe, Netherlands, 0.2 kg Bolec K and 1.8 kg of a fat mixture equivalent to that described in Example 10. The spray drying conditions were the same as those employed in Example 7.

EXAMPLE 12

Employing the procedure of Examples 1 to 5 a dry, free-flowing and non-caking powder was prepared from 17 l water, 1 kg Soycomil K, 1 kg of a fat mixture equivalent to that described in Example 1, 0.1 kg Bolec K and 3 kg maltodextrin. The maltodextrin, which is a water soluble sugar was added to the aqueous medium prior to the addition of the lipid phase. The resulting emulsion was fed to the spray drying tower at a temperature of from 44° to 46° C. The air inlet temperature was 220° C. and the air outlet temperature was 87° C.

EXAMPLE 13

A dry, free-flowing and non-caking powder was prepared from 300 g water, 300 g Soycomil K, 20 g Bolec K and 180 g of a fat mixture. The Soycomil K and water at a temperature of 60° C. were mixed in a Hobart mixer to form a loose dough. The fat mixture was pre-heated to 60° C. and combined with the Bolec K. The fatty phase and the rehydrated protein were mixed together in a Hobart mixer and the resulting mixture was feed to a drum dryer maintained at a temperature of 120° C. After a residence time of from 4 to 10 seconds the mixture was dried to the form of flakes having a moisture content of about 4 wt%. The flakes were subsequently ground to form a granular material.

EXAMPLE 14

A dry, free-flowing and non-caking powder was prepared by the following method in which a lipid phase comprising lecithin only is first mixed with the aqueous medium prior to combination with the proteinaceous material. A sludge was prepared from a 40:60 mixture of Bolec K and water and was sprayed on to Soycomil K and subsequently drum dried under the conditions given in Example 12. The moisture content of the dried flakes was about 4 wt% and the lecithin content was about 30 wt%. The flakes could be ground to form a granular product.

EXAMPLE 15

A molten fat mixture comprising 70 wt% fancy tallow and 30 wt% white hog grease, Bolec K and water were mixed together in proportions of fat:Bolec K:water of 27:3:50. Soycomil K was then added as 20 wt% of the final mixture so that the dry matter content of the aqueous slurry was 50 wt%. The slurry was homogenised and fed to one inlet of a spray drying tower having two inlets arranged for co-spray drying. To the other inlet a continuous stream of dry, finely divided Soycomil K was fed in a proportion of dry Soycomil K to homogenised slurry of 18:82. The homogenised slurry was thus atomised and dried in intimate contact with additional and dry Soycomil K. The resulting product was cooled in a fluidised bed and was a dry, free-flowing and non-caking powder.

The product thus had a Soycomil K:fat mixture:Bolec K ratio of 50:45:5 and was comparable to a powder containing an identical ingredients ratio, but produced according to the procedure described in Examples 1 to 5 and having a dry mixture content in the aqueous slurry prior to spray drying of 40 wt%. The process of the present Example thus allows a reduction in the amount of water employed and consequently permits a higher throughput in the spray drying tower leading to cost savings. In addition the process of the present Example produced a particularly free-flowing powder which readily passed through the fluidised bed and showed a minimum of grease smears on the bed walls.

We claim:

1. A process for preparing a free-flowing and non-caking lipid- and protein-containing material in particulate form comprising 95 to 35 wt.% of vegetable proteinaceous material, said proteinaceous material consisting of a porous particulate substance which comprises at least 30 wt.% of substantially water-insoluble protein and the balance of a lipid phase and 1 to 10 wt.% of water, said lipid phase comprising 80 to 99 wt.% of fats and/or oils and 1 to 20 wt.% of lecithin, said lipid phase being contained within interstitial spaces of individual particles of said porous substance, said process comprising preparing a suspension of either said proteinaceous matter or said lipid phase in an aqueous medium at elevated temperature, including therein the other component while ensuring that said lipid phase is molten, homogenizing the suspension obtained and drying the homogenized material.

2. A process according to claim 1, wherein the lipid phase contains at least 5 wt.% of lecithin.

3. A process according to claim 1, wherein the lecithin is a hydrolyzed phospholipids mixture.

4. A process according to claim 1, wherein the porous particulate substance comprises protein which is 85 to 95 wt.% insoluble in water.

5. A process according to claim 1, wherein the proteinaceous material is a soy concentrate.

6. A process according to claim 5, wherein the lipid phase comprises up to 65% of the total weight of proteinaceous material and lipid phase present.

7. A free-flowing and non-caking lipid- and protein-containing material in particulate form comprising 95 to 35 wt.% of vegetable proteinaceous material consisting of a porous particulate substance which comprises at least 30 wt.% of substantially water-insoluble protein, and the balance of a lipid phase and 1 to 10 wt.% of water, said lipid phase comprising 80 to 99 wt.% of fats and/or oils and 1 to 20 wt.% of lecithin, said lipid phase being contained within interstitial spaces of said porous substance.

8. A product according to claim 7, wherein the lipid phase contains at least 5 wt.% of lecithin.

9. A product according to claim 7, wherein the lecithin is a hydrolyzed phospholipids mixture.

10. A product according to claim 7, wherein the porous particulate substance comprises protein which is for 85 to 95 wt.% insoluble in water.

11. A product according to claim 7, wherein the proteinaceous material is a soy concentrate.

12. A product according to claim 11, wherein the lipid phase comprises up to 65% of the total weight of proteinaceous material and lipid phase present.

13. A foodstuff composition comprising a product according to claim 7.

14. A foodstuff comprising an aqueous phase, wherein a product according to claim 7 has been incorporated with said aqueous phase.

* * * * *